US011505141B2

(12) United States Patent
Jones et al.

(10) Patent No.: US 11,505,141 B2
(45) Date of Patent: Nov. 22, 2022

(54) ELECTRICAL SYSTEM WITH TRACK ASSEMBLY AND SUPPORT ASSEMBLY

(71) Applicant: Lear Corporation, Southfield, MI (US)

(72) Inventors: Jeffrey A. Jones, Ann Arbor, MI (US); Antoni Ferré Fàbregas, Valls (ES); Raúl Ricart, Valls (ES)

(73) Assignee: Lear Corporation, Southfield, MI (US)

( * ) Notice: Subject to any disclaimer, the term of this patent is extended or adjusted under 35 U.S.C. 154(b) by 61 days.

(21) Appl. No.: 17/078,706

(22) Filed: Oct. 23, 2020

(65) Prior Publication Data

US 2022/0126771 A1     Apr. 28, 2022

(51) Int. Cl.
| | |
|---|---|
| *B60R 16/03* | (2006.01) |
| *H02G 5/02* | (2006.01) |
| *B60R 16/027* | (2006.01) |

(52) U.S. Cl.
CPC ............ *B60R 16/03* (2013.01); *B60R 16/027* (2013.01); *H02G 5/025* (2013.01)

(58) Field of Classification Search
CPC ........ H02G 5/025; B60R 16/027; B60R 16/03
USPC .................................................. 307/9.1, 10.1
See application file for complete search history.

(56) References Cited

U.S. PATENT DOCUMENTS

| | | | |
|---|---|---|---|
| 2,126,143 A | 8/1938 | McGregor | |
| 2,263,554 A | 11/1941 | Brach | |
| 2,480,622 A | 8/1949 | Warnock | |
| 2,678,082 A | 5/1954 | Nathan | |
| 3,096,066 A | 7/1963 | Granet et al. | |
| 3,181,102 A | 4/1965 | Fehr | |
| 3,213,403 A | 10/1965 | Hermann | |
| 3,268,848 A | 8/1966 | Adams | |
| 3,603,918 A | 9/1971 | Woertz | |
| 3,933,403 A | 1/1976 | Rubesamen et al. | |
| 3,940,182 A | 2/1976 | Tamura | |
| 4,020,769 A | 5/1977 | Keir | |
| 4,198,025 A | 4/1980 | Lowe et al. | |
| 4,238,099 A | 12/1980 | Hunwicks | |
| 4,243,248 A | 1/1981 | Scholz et al. | |
| 4,282,631 A | 8/1981 | Uehara et al. | |
| 4,511,187 A | 4/1985 | Rees | |

(Continued)

FOREIGN PATENT DOCUMENTS

| | | |
|---|---|---|
| CN | 203190203 U | 9/2013 |
| CN | 203799201 U | 8/2014 |

(Continued)

OTHER PUBLICATIONS

Co-Pending U.S. Appl. No. 16/597,187, filed Oct. 9, 2019.

(Continued)

*Primary Examiner* — Michael R. Fin
(74) *Attorney, Agent, or Firm* — Fishman Stewart PLLC

(57) ABSTRACT

An electrical system may include a track assembly, a support assembly, a sensor, and at least one electronic control unit. The track assembly may include a bus bar. The support assembly may include a contact configured to engage the bus bar. The support assembly may be removably and adjustably connected to the track assembly. The at least one electronic control unit may be operatively connected to the bus bar and the sensor. The at least one electronic control unit may be configured to determine whether the support assembly and the track assembly are properly connected to one another.

20 Claims, 9 Drawing Sheets

(56) References Cited

U.S. PATENT DOCUMENTS

| | | |
|---|---|---|
| 4,575,295 A | 3/1986 | Rebentisch |
| 4,618,808 A | 10/1986 | Ish-Shalom et al. |
| 4,707,030 A | 11/1987 | Harding |
| 4,711,589 A | 12/1987 | Goodbred |
| 4,763,360 A | 8/1988 | Daniels et al. |
| 4,776,809 A | 10/1988 | Hall |
| 4,830,531 A | 5/1989 | Condit et al. |
| 4,853,555 A | 8/1989 | Wheat |
| 4,941,636 A | 7/1990 | Fujiwara et al. |
| 4,961,559 A | 10/1990 | Raymor |
| 4,969,621 A | 11/1990 | Munchow et al. |
| 4,987,316 A | 1/1991 | White et al. |
| 5,106,144 A | 4/1992 | Hayakawa et al. |
| 5,137,331 A | 8/1992 | Colozza |
| 5,167,393 A | 12/1992 | Hayakawa et al. |
| 5,192,045 A | 3/1993 | Yamada et al. |
| 5,222,814 A | 6/1993 | Boelryk |
| 5,302,065 A | 4/1994 | Vogg et al. |
| 5,322,982 A | 6/1994 | Leger et al. |
| 5,332,290 A | 7/1994 | Borlinghaus et al. |
| 5,348,373 A | 9/1994 | Stiennon |
| 5,362,241 A | 11/1994 | Matsuoka et al. |
| 5,446,442 A | 8/1995 | Swart et al. |
| 5,466,892 A | 11/1995 | Howard et al. |
| 5,489,173 A | 2/1996 | Hofle |
| 5,524,504 A | 6/1996 | Brandoli et al. |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,796,177 A | 8/1998 | Werbelow et al. |
| 5,800,015 A | 9/1998 | Tsuchiya et al. |
| 5,893,545 A | 4/1999 | Lyons et al. |
| 5,899,532 A | 5/1999 | Paisley et al. |
| 5,918,847 A | 7/1999 | Couasnon |
| 5,921,606 A | 7/1999 | Moradell et al. |
| 5,964,442 A | 10/1999 | Wingblad et al. |
| 5,964,815 A | 10/1999 | Wallace et al. |
| 6,008,547 A | 12/1999 | Dobler et al. |
| 6,036,157 A | 3/2000 | Baroin et al. |
| 6,081,044 A | 6/2000 | Anthofer et al. |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,260,813 B1 | 7/2001 | Whitcomb |
| 6,290,516 B1 | 9/2001 | Gerber |
| 6,296,498 B1 | 10/2001 | Ross |
| 6,299,230 B1 | 10/2001 | Oettl |
| 6,318,802 B1 | 11/2001 | Sjostrom et al. |
| 6,325,645 B1 | 12/2001 | Schuite |
| 6,357,814 B1 | 3/2002 | Boisset et al. |
| 6,364,272 B1 | 4/2002 | Schuler et al. |
| 6,400,259 B1 | 6/2002 | Bourcart et al. |
| 6,405,988 B1 | 6/2002 | Taylor et al. |
| 6,422,596 B1 | 7/2002 | Fendt et al. |
| 6,439,531 B1 | 8/2002 | Severini et al. |
| 6,480,144 B1 | 11/2002 | Miller et al. |
| 6,565,119 B2 | 5/2003 | Fogle, Jr. |
| 6,566,765 B1 | 5/2003 | Nitschke et al. |
| 6,588,722 B2 | 7/2003 | Eguchi et al. |
| 6,693,368 B2 | 2/2004 | Schumann et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,805,375 B2 | 10/2004 | Enders et al. |
| 6,851,708 B2 | 2/2005 | Kazmierczak |
| 6,869,057 B2 | 3/2005 | Matsumoto et al. |
| 6,882,162 B2 | 4/2005 | Schirmer et al. |
| 6,960,993 B2 | 11/2005 | Mattes et al. |
| 7,042,342 B2 | 5/2006 | Luo et al. |
| 7,083,437 B2 | 8/2006 | Mackness |
| 7,086,874 B2 | 8/2006 | Mitchell et al. |
| 7,113,541 B1 | 9/2006 | Lys et al. |
| 7,159,899 B2 | 1/2007 | Nitschke et al. |
| 7,170,192 B2 | 1/2007 | Kazmierczak |
| 7,188,805 B2 | 3/2007 | Henley et al. |
| 7,207,541 B2 | 4/2007 | Frohnhaus et al. |
| 7,271,501 B2 | 9/2007 | Dukart et al. |
| 7,288,009 B2 | 10/2007 | Lawrence et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,370,831 B2 | 5/2008 | Laib et al. |
| 7,388,466 B2 | 6/2008 | Ghabra et al. |
| 7,389,960 B2 | 6/2008 | Mitchell et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,503,522 B2 | 3/2009 | Henley et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,819,472 B2 | 10/2010 | Hutchinson et al. |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,578 B2 | 6/2014 | Kitamura et al. |
| 8,757,720 B2 | 6/2014 | Hurst, III et al. |
| 8,800,949 B2 | 8/2014 | Schebaum et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,422,058 B2 | 8/2016 | Fischer et al. |
| 9,561,770 B2 | 2/2017 | Sievers et al. |
| 9,608,392 B1 | 3/2017 | Destro |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,879,458 B2 | 1/2018 | Gabriel et al. |
| 9,919,624 B2 | 3/2018 | Cziomer et al. |
| 9,950,682 B1 | 4/2018 | Gramenos et al. |
| 10,059,232 B2 | 8/2018 | Frye et al. |
| 10,160,351 B2 | 12/2018 | Sugimoto et al. |

(56) References Cited

U.S. PATENT DOCUMENTS

| | | |
|---|---|---|
| 10,479,227 B2 | 11/2019 | Nolte et al. |
| 10,485,717 B2 | 11/2019 | Moss |
| 10,493,243 B1 | 12/2019 | Braham |
| 10,547,135 B2 | 1/2020 | Sugiura |
| 10,549,659 B2 | 2/2020 | Sullivan et al. |
| 10,654,378 B2 | 5/2020 | Pons |
| 2002/0153900 A1* | 10/2002 | Shimizu ............... H01R 13/641 324/538 |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1* | 9/2005 | Henley ..................... H02G 3/00 244/118.6 |
| 2005/0215098 A1 | 9/2005 | Muramatsu et al. |
| 2005/0230543 A1 | 10/2005 | Laib et al. |
| 2005/0236899 A1 | 10/2005 | Kazmierczak |
| 2005/0242604 A1 | 11/2005 | Bonnes et al. |
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0108808 A1* | 5/2010 | Allain ................. B64D 11/0624 439/34 |
| 2010/0117275 A1 | 5/2010 | Nakamura |
| 2011/0024595 A1 | 2/2011 | Oi et al. |
| 2011/0225773 A1 | 9/2011 | Hearn et al. |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2013/0153735 A1 | 6/2013 | Ruthman et al. |
| 2013/0341479 A1 | 12/2013 | Yamada et al. |
| 2014/0110554 A1 | 4/2014 | Oya et al. |
| 2014/0224954 A1 | 8/2014 | Oh et al. |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0052819 A1 | 2/2015 | Lee |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2015/0298580 A1 | 10/2015 | Kanai |
| 2016/0039314 A1 | 2/2016 | Anticuar et al. |
| 2016/0154170 A1 | 6/2016 | Thompson et al. |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0058122 A1 | 3/2018 | Lang |
| 2018/0072188 A1 | 3/2018 | Yamada |
| 2018/0086230 A1 | 3/2018 | Kume et al. |
| 2018/0086232 A1 | 3/2018 | Kume |
| 2018/0105072 A1 | 4/2018 | Pons |
| 2018/0126875 A1 | 5/2018 | Kume et al. |
| 2018/0148011 A1 | 5/2018 | Zaugg et al. |
| 2018/0154799 A1 | 6/2018 | Lota |
| 2018/0183623 A1 | 6/2018 | Schoenfeld et al. |
| 2018/0244175 A1 | 8/2018 | Tan |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0010001 A1 | 1/2020 | Pinkelman et al. |
| 2020/0047641 A1 | 2/2020 | D'Eramo et al. |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0247275 A1 | 8/2020 | Yetukuri et al. |
| 2020/0262367 A1 | 8/2020 | Fernandez Banares et al. |
| 2020/0269754 A1 | 8/2020 | Ricart et al. |
| 2020/0282871 A1 | 9/2020 | Ricart et al. |
| 2020/0282880 A1 | 9/2020 | Jones et al. |
| 2021/0265776 A1* | 8/2021 | Moulin ................. B60N 2/0722 |

FOREIGN PATENT DOCUMENTS

| | | |
|---|---|---|
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102011056278 A1 | 2/2013 |
| DE | 202014102336 U1 | 6/2014 |
| DE | 102015212100 A1 | 12/2015 |
| DE | 102016113409 A1 | 4/2017 |
| EP | 0783990 A1 | 7/1997 |
| EP | 1176047 A1 | 1/2002 |
| EP | 2298609 B1 | 3/2011 |
| EP | 3150426 A1 | 4/2017 |
| FR | 2762814 A1 | 11/1998 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2005068247 A2 | 7/2005 |

OTHER PUBLICATIONS

Co-Pending U.S. Appl. No. 16/672,989, filed Nov. 4, 2019.
Co-Pending U.S. Appl. No. 16/711,661, filed Dec. 12, 2019.
Co-Pending U.S. Appl. No. 17/060,566, filed Oct. 1, 2020.
Co-Pending U.S. Appl. No. 17/060,635, filed Oct. 1, 2020.
Co-Pending U.S. Appl. No. 17/060,985, filed Oct. 1, 2020.
Co-Pending U.S. Appl. No. 17/116,959, filed Dec. 9, 2020.

* cited by examiner

ELECTRICAL SYSTEM WITH TRACK ASSEMBLY AND SUPPORT ASSEMBLY

TECHNICAL FIELD

The present disclosure generally relates to an electrical system that may be used in connection with a support assembly and a track assembly, such as for a vehicle seat.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical systems may be difficult to operate, inefficient, may not allow a support assembly to be removed from a track assembly, and/or may have a limited number of available positions at which a support assembly may be disposed on a track assembly.

There is a desire for solutions/options that minimize or eliminate one or more challenges or shortcomings of electrical systems for vehicles. The foregoing discussion is intended only to illustrate examples of the present field and is not a disavowal of scope.

SUMMARY

In embodiments, an electrical system of a vehicle may include a track assembly, a support assembly, a sensor, and at least one electronic control unit. The track assembly may include a bus bar. The support assembly may include a contact configured to engage the bus bar. The support assembly may be removably and adjustably connected to the track assembly. The at least one electronic control unit may be operatively connected to the bus bar and the sensor. The at least one electronic control unit may be configured to determine whether the support assembly and the track assembly are properly connected.

In embodiments, a method of operating an electrical system of a vehicle may include connecting a support assembly and a track assembly to one another. The method may also include determining, via a sensor associated with the support assembly and/or the track assembly, whether the support assembly and the track assembly are properly connected. Additionally, the method may include performing, automatically via an electronic control unit, a corrective action if the support assembly and the track assembly are not properly connected. The method may further include, after performing the corrective action, determining whether the support assembly and the track assembly are properly connected.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
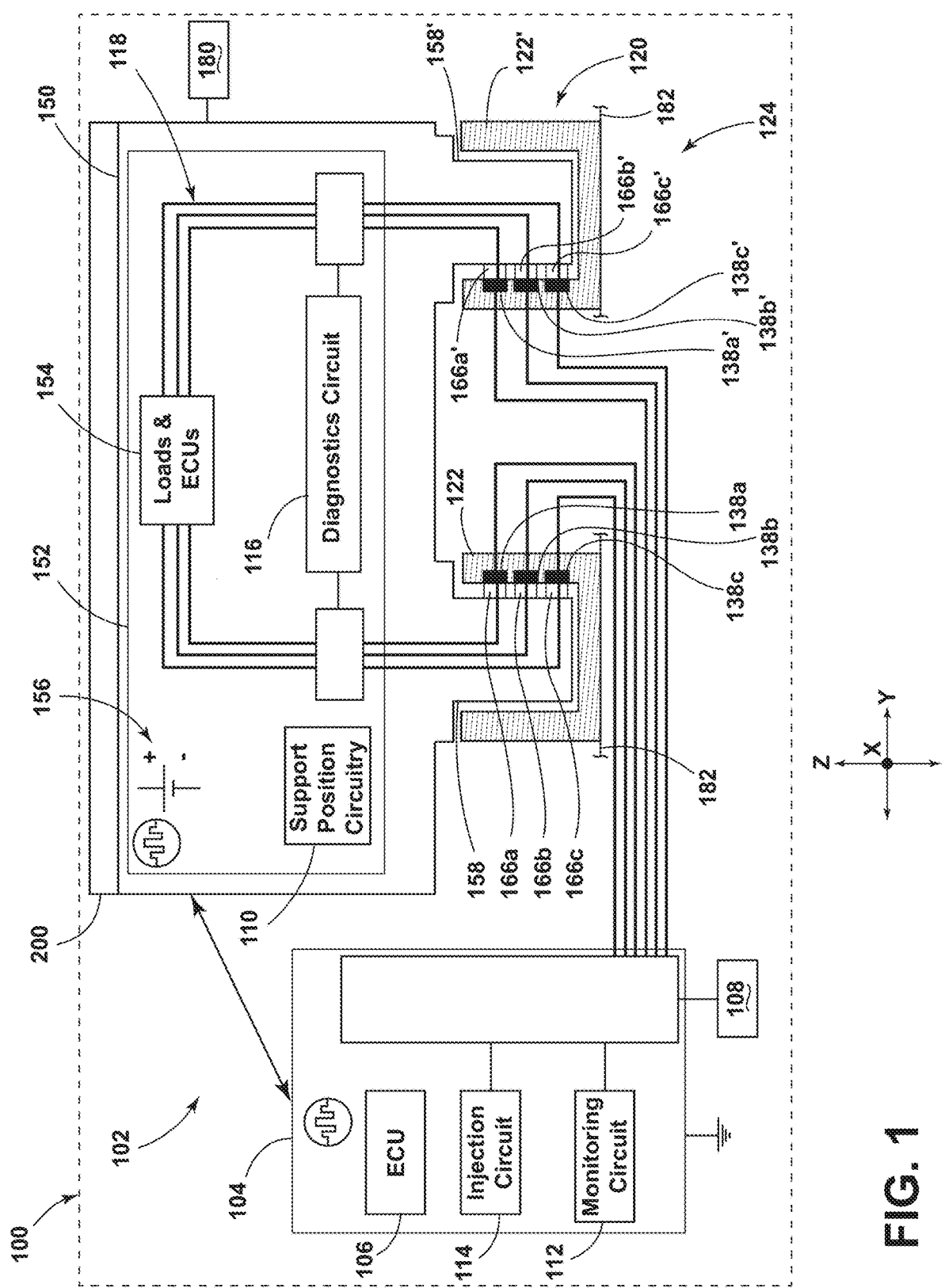
FIG. 1 is a block diagram generally illustrating an embodiment of an electrical system according to teachings of the present disclosure.
Figure 2:
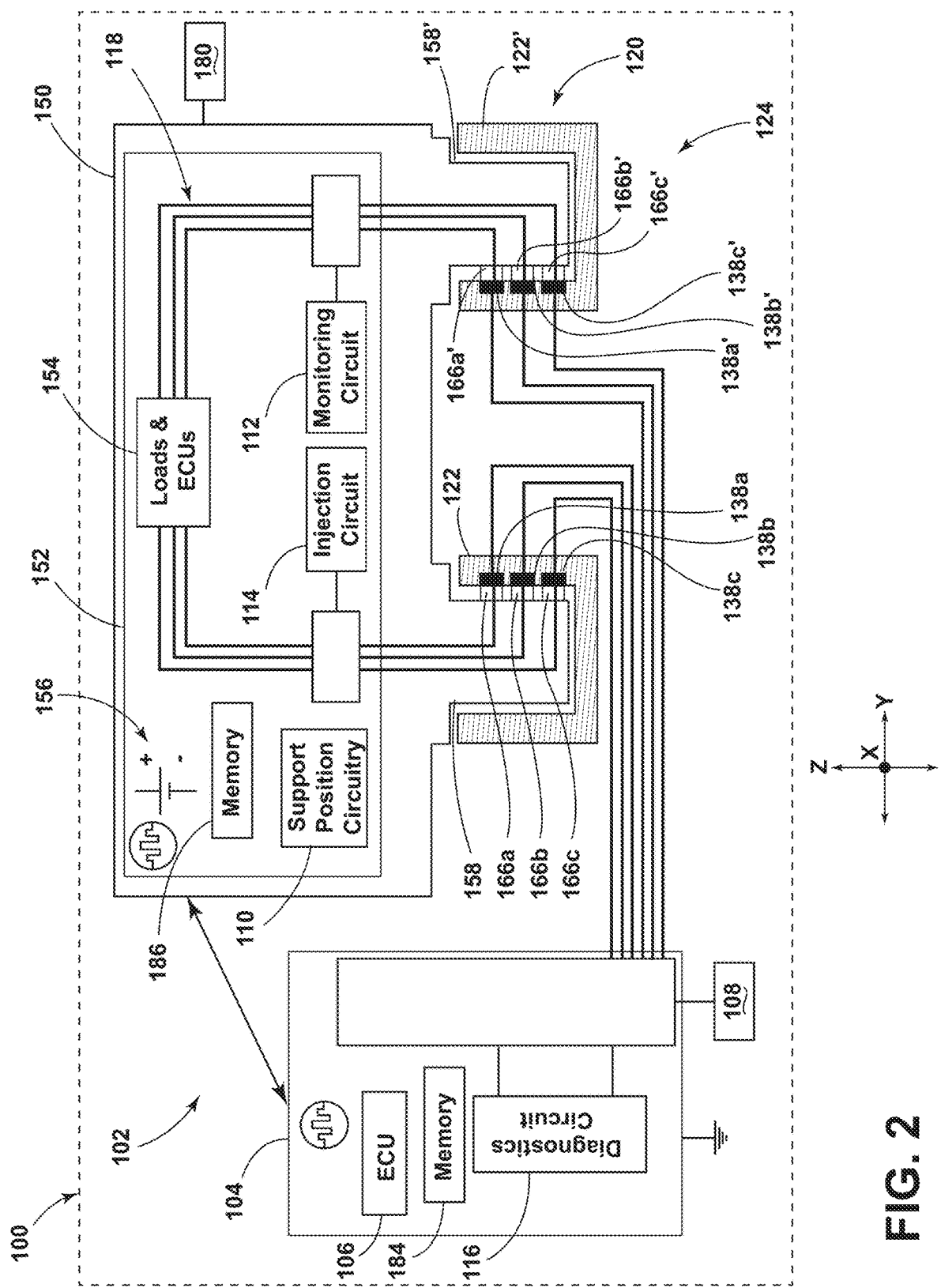
FIG. 2 is a block diagram generally illustrating another embodiment of an electrical system according to teachings of the present disclosure.

In embodiments, such as generally illustrated in FIGS. 1 and 2, an electrical system 102 may include at least one first controller 104, at least one track assembly 120, and/or at least one support assembly 150. A first controller 104 may be connected, at least indirectly, to a mounting surface 182 and/or may be disposed separately from the support assembly 150. For example and without limitation, a first controller 104 may be fixed relative to the mounting surface 182. The first controller 104 may include and/or be connected to an electronic control unit (ECU) 106, a power source 108, a monitoring circuit 112, an injection circuit 114, a support assembly actuator/adjuster 180, and/or a variety of circuitry, loads, wires, and other electrical and non-electrical components. In some embodiments, the electrical system 102 may not include a first controller 104 and, instead, rely solely on a controller of the support assembly 150 (e.g., a second controller 152) and/or one or more other controllers (e.g., a remote server, a smart phone, etc.). A support assembly 150 may support, be connected to, and/or include a component 200, which may be configured as a seat (e.g., a vehicle seat), a console, and/or a rack, among other things. A seat may, for example, include a seat frame, a seat bottom, and/or a seat back. An electrical system 102 may, for example and without limitation, be connected to and/or incorporated with a vehicle 100, which may include the mounting surface 182 (e.g., a vehicle floor/wall, a vehicle frame, etc.).

In embodiments, such as generally illustrated in FIGS. 3A-3E, a track assembly 120 may be connected to the mounting surface 182 and may facilitate selective connection of one or more support assemblies 150 to the mounting surface 182. A track assembly 120 may also facilitate adjustment of one or more support assemblies 150, such as relative to the mounting surface 182 and/or within a vehicle 100. A support assembly 150 may be adjusted manually and/or via an actuator 180 (e.g., an electric motor operatively connected to the support assembly 150 and/or the track assembly 120). A track assembly 120 may include one or more tracks 122, rails, and/or other structures to which a support assembly 150 may be connectable and adjustable (e.g., slidable). A track assembly 120 may include a plurality of track sets 124, each including one or more tracks 122, 122' that may be configured to engage a corresponding support assembly portion 158, 158' of a support assembly 150. Several tracks 122, 122' and/or track sets 124 may be connected to a portion of the mounting surface 182 (e.g., a floor, wall, ceiling, etc.) and disposed adjacent to one another and/or may extend parallel to one another. One or more tracks 122, 122' may be structured identically to one other and/or differently from one another. Tracks 122, 122' may, for example, be offset from each other in a lateral direction (e.g., a Y-direction) such that the tracks 122, 122' may be generally aligned with respective outer sides of the support assembly 150.

With embodiments, such as generally illustrated in FIGS. 3A-3E, a track 122 may be an elongated member extending in the X-direction. A track 122 may have a base 126 and two wall portions (e.g., a first wall portion 128a and a second wall portion 128b) protruding from the base 126 to form a generally U shaped cross-section in a Y-Z plane (e.g., in a plane perpendicular to an X-direction). The U-shaped cross section may define a track receptacle 134 configured to receive and at least temporarily retain a portion 158, 158' of a support assembly 150. A first lip portion 132a, and a second lip portion 132b may project toward one another from a free end 130a, 130b of the first wall portion 128a and the second wall portion 128b, respectively. A track opening 136 may be defined between the two lip portions 132a, 132b. A portion 158, 158' of a support assembly 150 may be inserted into and retained within the track receptacle 134 via the track opening 136.

In embodiments, such as generally illustrated in FIGS. 3A-3E, a track 122 may include one or more electrical conductors (e.g., bus bars) 138, 138a, 138b, 138c. A bus bar 138 may be operatively connected to the first controller 104 and/or a power source 108. A bus bar 138 may be connected to the first wall portion 128a and/or the second wall portion 128b of the track 122, and/or any other portion of the track 122. A bus bar 138 may be disposed and connected to the track 122 such that the bus bar 138 is able to make contact with a corresponding electrical contact 172, 172a, 172b, 172c of a support assembly 150.

Figure 3A:
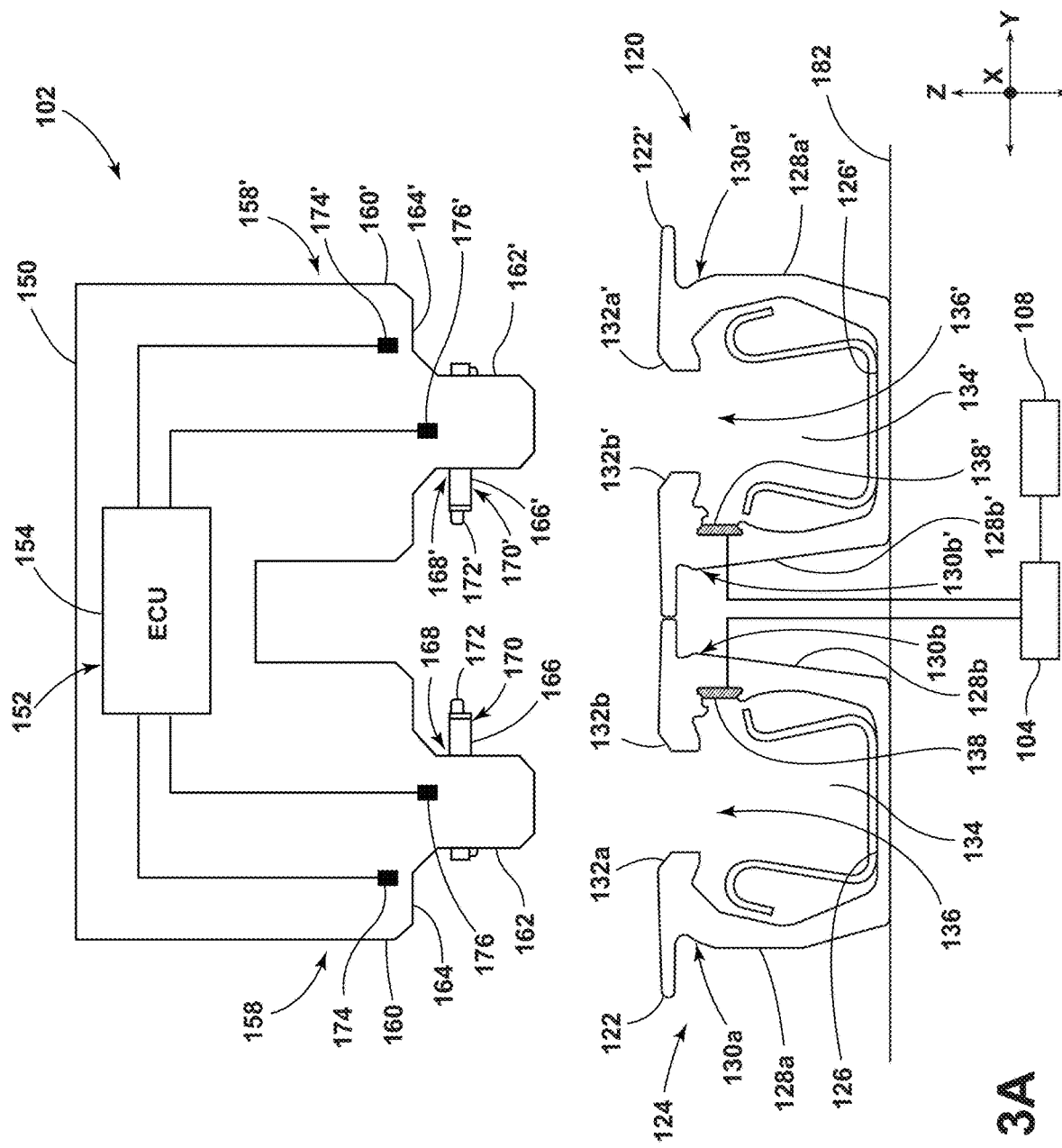
FIG. 3A through 3D are end views generally illustrating different positions of a support assembly relative to a track assembly of an embodiment of an electrical system according to teachings of the present disclosure.
Figure 3B:
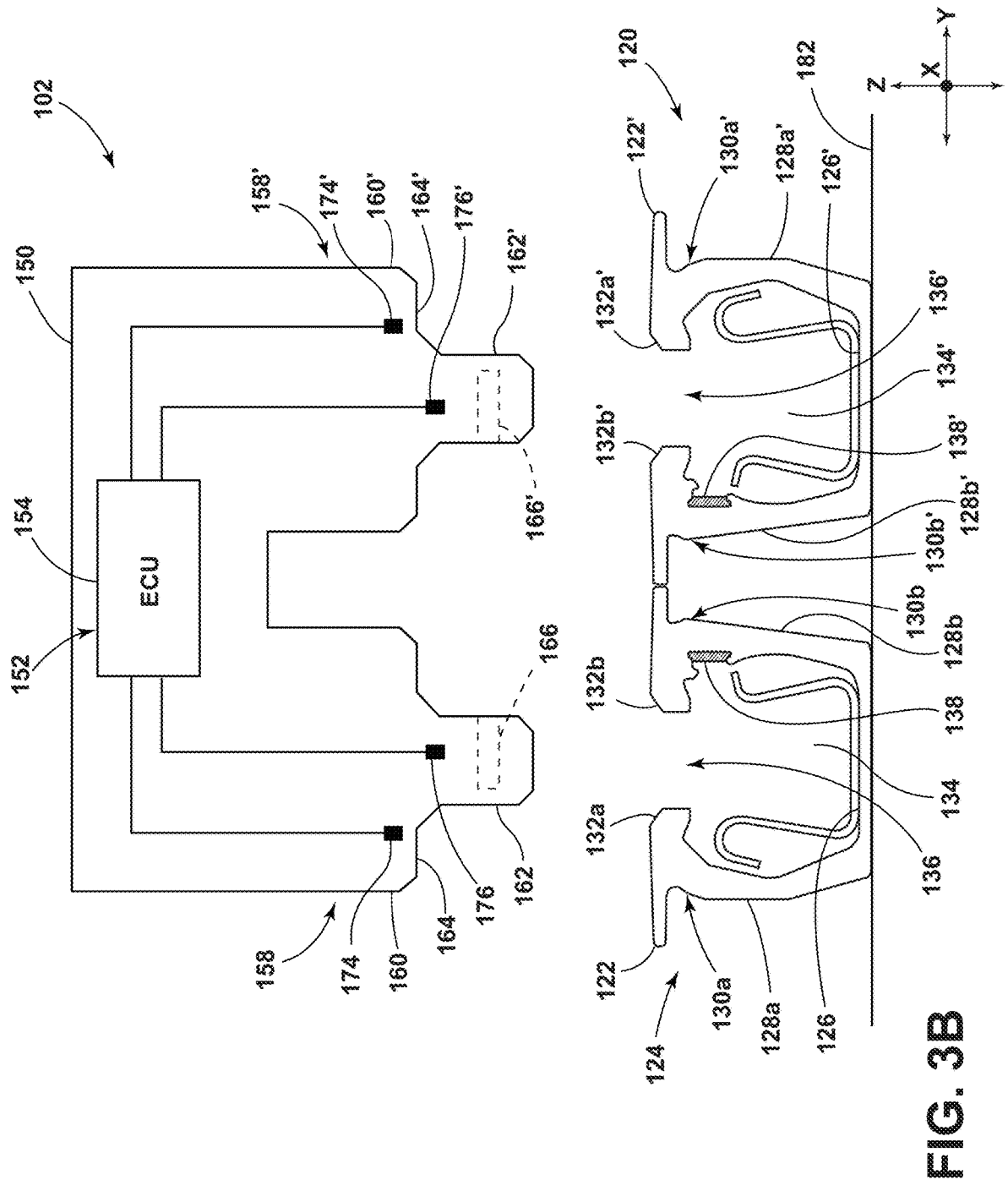
Figure 3C:
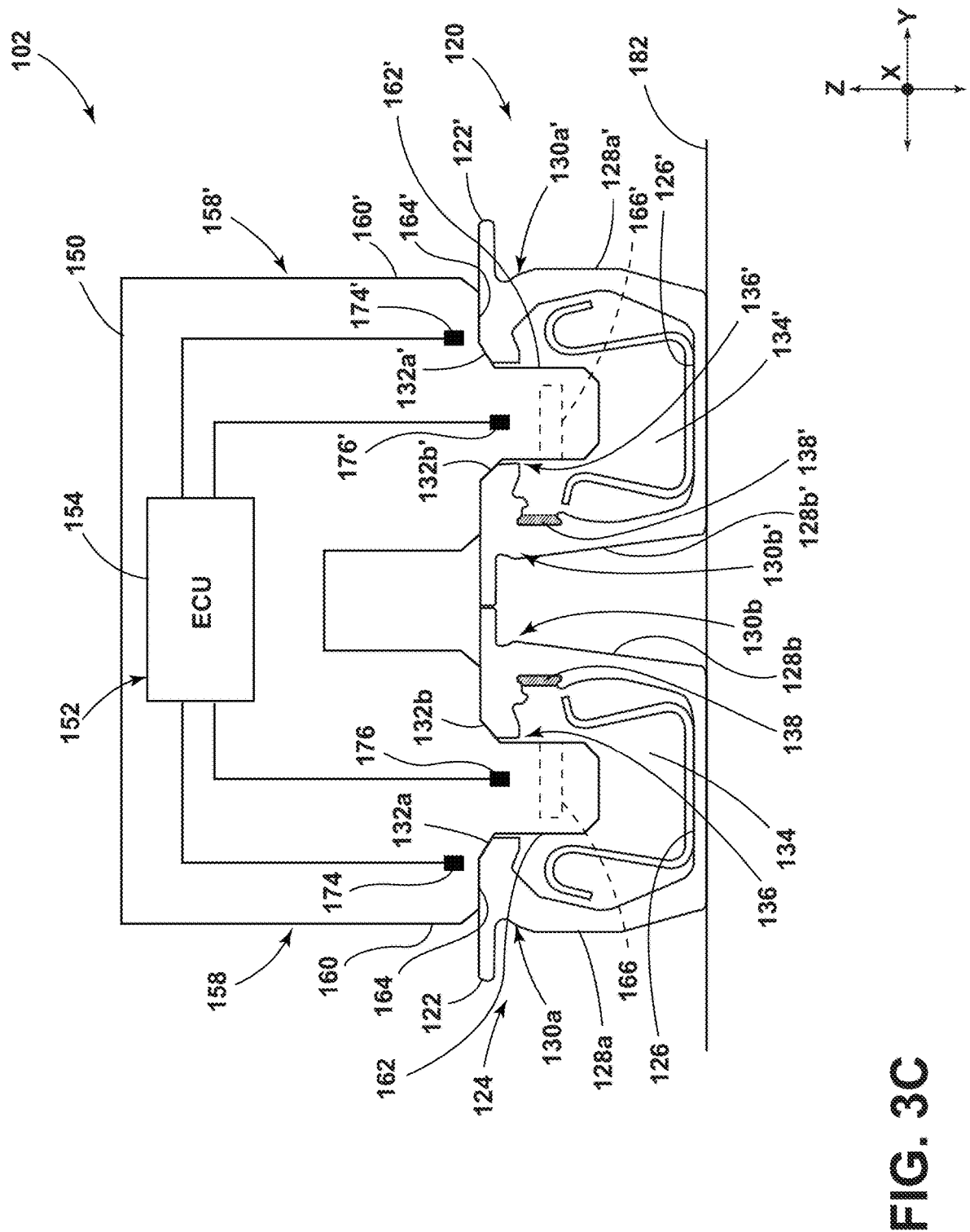

With embodiments, a bus bar 138 may be disposed within the track receptacle 134 and connected to the first wall portion 128a and/or the second wall portion 128b as generally illustrated in FIGS. 3A-3D. In other embodiments, such as generally illustrated in FIG. 3E, a track 122 may include a plurality of bus bars 138, such as a first bus bar 138a, a second bus bar 138b, and/or a third bus bar 138c. The first, second, and third bus bars 138a, 138b, 138c may be disposed within the track receptacle 134 and may be connected to the first wall portion 128a and/or the second wall portion 128b. However, the first, second, and third bus bars 138a, 138b, 138c may be connected to any portion of the track 122 and disposed in any desired position so long as they may be contacted by the corresponding electrical contact 172a, 172b, 172c of the support assembly 150.

In embodiments, such as generally illustrated in FIGS. 3A-3E, a track assembly 120 may include a track set 124 including a first track 122 and a second track 122'. The first track 122 may include a base 126, a first wall portion 128a having a free end 130a, a second wall portion 128b having a free end 130b, a first track lip 132a, a second track lip 132b, a track receptacle 134, a track opening 136, and/or one or more bus bars 138, 138a, 138b, 138c. The second track 122' may include the same or a similar configuration as the first track 122. For example, the second track 122' may include a base 126', a first wall portion 128a' having a free end 130a', a second wall portion 128b' having a free end 130b', a first track lip 132a', a second track lip 132b', a track receptacle 134', a track opening 136', and/or one or more bus bars 138', 138a', 138b', 138c', some or all of which may be configured in the same or similar manner as corresponding features of the first track 122.

With embodiments, such as generally illustrated in FIGS. 3A-3E, a support assembly 150 may include at least one second controller 152, and one or more support portions 158, 158'. The support assembly 150 may be detachably and/or adjustably connected to a track 122, 122' and/or a mounting surface 182 via a support portion 158, 158'. The second controller 152 may be disposed externally on the support assembly 150 and/or may be integrated within the support assembly 150. The second controller 152 may include an ECU 154, a power source 156 (e.g., a back-up power source), electrical loads, wires, and other electrical and non-electrical components. Alternatively, some embodiments of a support assembly 150 may not include a second controller 152 and, instead, may rely solely on one or more other controllers of the electrical system 102 and/or a vehicle 100 (e.g., one or more first controllers 104).

In embodiments, such as generally illustrated in FIGS. 3A-3E, a support portion 158, 158' may be configured as a base, a leg, and/or a support structure, for example. A support portion 158 may include a first section 160 and a second section 162. A first section 160 may project from the support assembly 150 downward in a Z-direction. A second section 162 may be connected to the first section 160 and/or may be configured to engage a track 122. A second section 162 may protrude from the first section 160 downward in the Z-direction or in any other desired direction such that second section 162 may engage a track 122. A second section 162 may be configured to engage a track 122, such as via being inserted into a track receptacle 134 through a track opening 136.

With embodiments, such as generally illustrated in FIGS. 3A-3E, a support portion 158 may include a stop portion 164 configured to facilitate insertion of the support portion 158 to a proper depth within a track 122. A stop portion 164 may be a structure configured to abut against a portion of the track 122 to prevent further insertion of the support portion 158 within the track receptacle 134. A stop portion 164 may be configured as a shoulder of the support portion 158, for example. The shoulder of the support portion (e.g., the stop portion 164) may be formed at and/or by a transition between the first section 160 and the second section 162. Additionally and/or alternatively, the stop portion 164 may be defined by a flange, protrusion, and/or other body connected to the support portion 158.

In embodiments, such as generally illustrated in FIGS. 3A-3E, a support portion 158 may include one or more connectors 166, 166a, 166b, 166c via which the support portion 158 may be connected and/or engaged with the track 122. A connector 166 may have a base end 168 connected to the support portion 158 (e.g., the second section 162) and a distal end 170 disposed opposite the base end 168. A connector 166 may be an actuatable connector that is adjustable between a retracted position and an extended position, such as, for example, via an actuator 180, manually, and/or automatically (e.g., via a lever, a linkage, a slider, etc.). When in a retracted position, the distal end 170 of a connector 166 may be disposed proximal to the support portion 158 and/or the second section 162 (see, e.g., FIGS. 3B and 3C). The connector 166 may not engage a track 122 when in the retracted position, which may allow (or at least not restrict) adjustment of the support assembly 150 along the track 122 and/or disengagement or removal from the track 122. Actuation of a connector 166 while in the retracted position may cause the connector 166 to extend away from the support portion 158 and/or the second section 162 toward an extended position where the distal end 170 is disposed further from the support portion 158 and may engage and/or contact the track 122 (see, e.g., FIG. 3D) and/or may not engage and/or contact the track 122 (see, e.g., FIGS. 3A and 3E). Conversely, actuation of a connector 166 in the extended position may cause the connector 166 to retract toward the retracted position.

With embodiments, such as generally illustrated in FIGS. 3A-3E, a connector 166 may include one or more electrical contacts 172 configured to contact/engage a corresponding bus bar 138, 138a, 138b, 138c of the track 122. An electrical contact 172 may be electrically connected, at least indirectly, to the second controller 152. Additionally and/or alternatively, an electrical contact 172 may be connected to the distal end 170 of a connector 166. In this manner, when the support portion 158 is properly disposed on the track, actuation of the connector 166 may adjust a position of the electrical contact 172 to (i) engage and/or establish contact between the electrical contact 172 and the corresponding bus bar 138 and/or (ii) disengage and/or break contact between the electrical contact 172 and the corresponding bus bar 138. Actuation of a contact may be manual (e.g., via a lever/slider) and/or automatic (e.g., mechanically automatic upon disposing the support assembly 150 on a track 122, electrically automatic via a controller 104, 152 and/or an actuator 180).

Figure 3D:
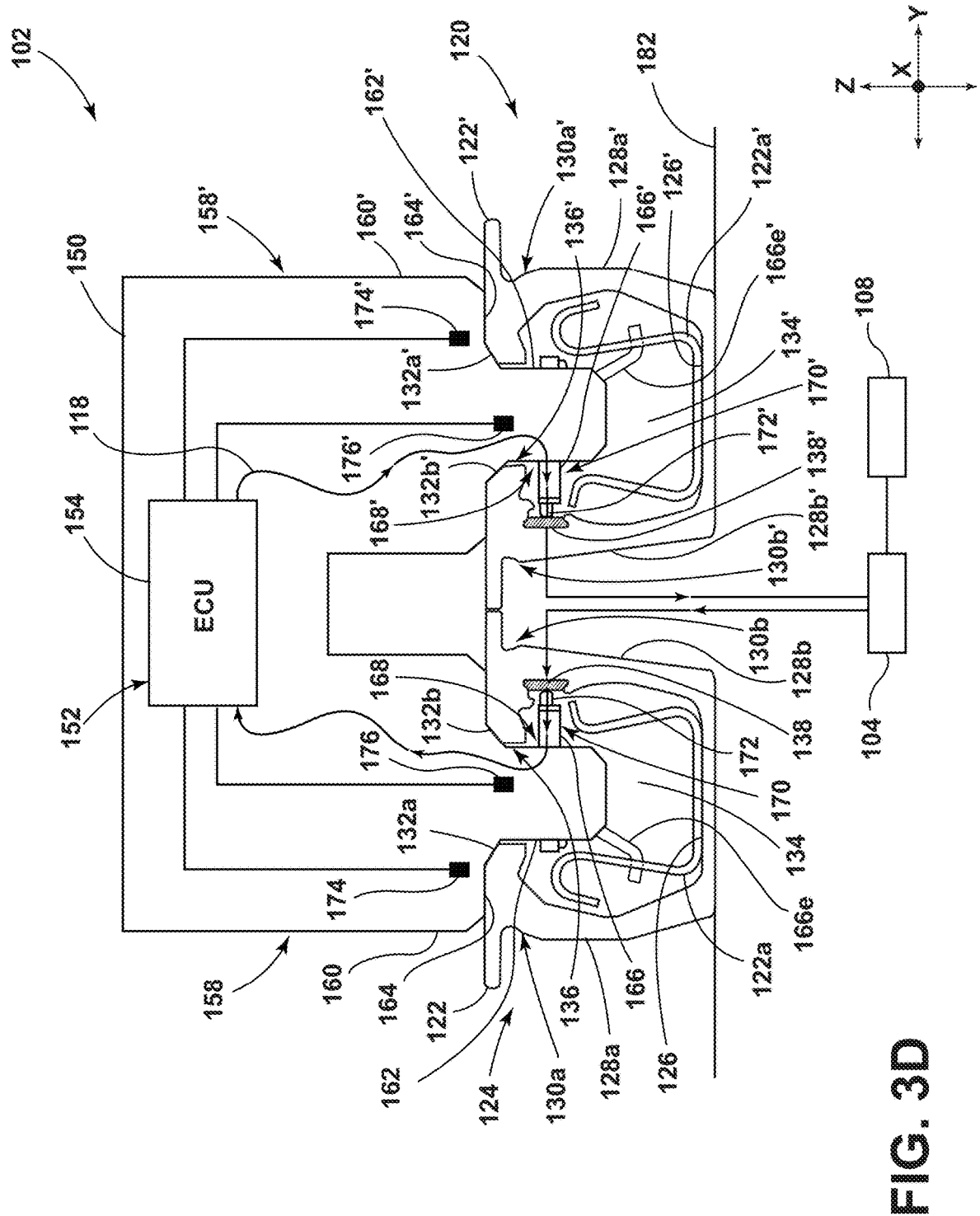
Figure 3E:
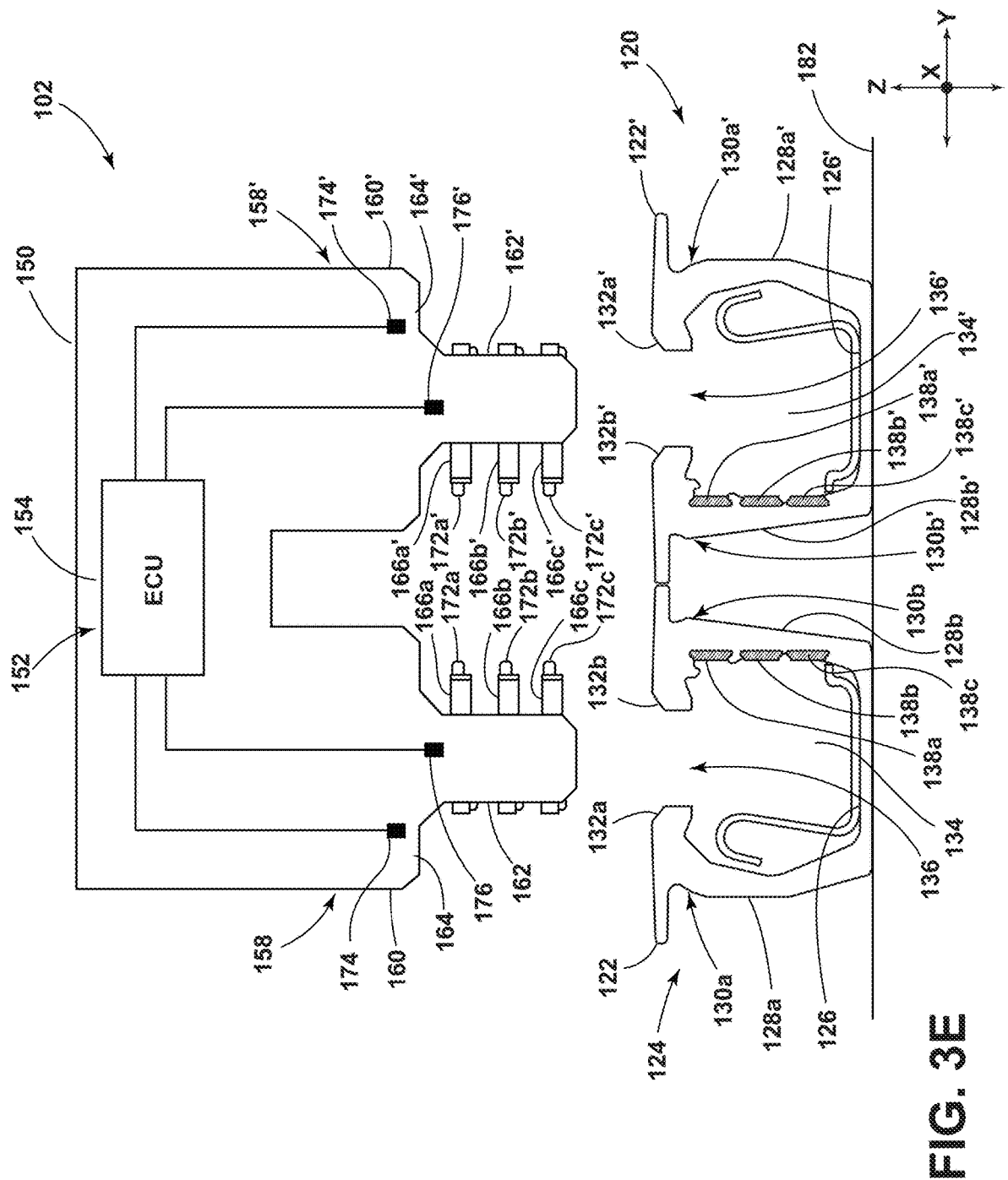
FIG. 3E is an end view generally illustrating a support assembly and a track assembly of an embodiment of an electrical system according to teachings of the present disclosure.

In embodiments, such as generally illustrated in FIGS. 1, 2, and 3D, an electrical contact 172 and a bus bar 138 may form at least a portion of an electrical loop 118 when the electrical contact 172 and the corresponding bus bar 138 are in contact with one another. The electrical loop 118 may be a closed path circuit extending from the first controller 104, including/passing through one or more bus bars 138 of a first track 122, the corresponding electrical contact(s) 172 of a first support portion 158, the second controller 152, one or more electrical contacts 172' of a second support portion 158', the corresponding bus bar(s) 138' of a second track 122', and returning to the first controller 104. An electrical current may be passed through the electrical loop 118 to establish an electrical connection between the electrical contact 172 and the bus bar 138, such as to provide power to the first controller 104, the second controller 152, and/or loads connected thereto.

With embodiments, such as generally illustrated in FIGS. 3A-3E, a support assembly 150 may be detachably connected to the track assembly 120 such that the support assembly 150 may be completely separated from the track assembly 120 and/or may be removed from a mounting surface 182 and/or a vehicle 100. For example, the support assembly 150 may be adjusted, pulled, lifted, etc. to remove the second section 162 of the support portion 158 from the track receptacle 134 when the connector 166 is in the retracted position. To reconnect the support assembly 150 and the track assembly 120, when the connector 166 is in the retracted position, the second section 162 of the support portion 158 may be inserted into the track receptacle 134 through the track opening 136 such that support assembly 150 is disposed, arranged, deposited, dropped, etc. on the track assembly 120. The support assembly 150 may be properly disposed on the track assembly 120 when (i) the stop portion 164 contacts/abuts and/or is adjacent the first lip 132a and/or second lip 132b of the track 122, and/or (ii) the stop portion 164 is substantially parallel to and within a threshold distance (e.g., in a Z-direction) of the track 122. Once the support assembly 150 is disposed on the track assembly 120, the connector 166 may be actuated to an extended position to provide an electrical connection between the track assembly 120 (and the first controller 104) and the support assembly 150. If the support assembly 150 is not properly disposed on the track assembly 120 (e.g., is not adjacent and/or substantially parallel with, is at an oblique angle to, etc.), a connector 166 may not be engaged with and/or may be unable to engage a bus bar 138, which may prevent a proper connection of the support assembly 150 with the track assembly 120.

In embodiments, such as generally illustrated in FIGS. 3A-3E, the electrical system 102 and/or the support assembly 150 may be configured to determine if the support assembly 150 is properly connected to (e.g., disposed on, mechanically connected with, and/or electrically connected with) the track assembly 120. For example, the electrical system 102 and/or the support assembly 150 may include one or more first sensors 174 and/or one or more second sensors 176 that may be configured to detect a position of one or more portions of a support assembly 150, such as relative to a track assembly 120. A first sensor 174 and/or a second sensor 176 may, for example and without limitation, include a detent sensor, a capacitive sensor, metal detector, a light sensor, a proximity sensor, a Hall sensor, an IR sensor, an altimeter, a conjoint lever, a rotary switch, a reed switch, and/or any other type of sensor, mechanism, device, etc. A first sensor 174 and/or a second sensor 176 may be operatively connected to (e.g., in wired and/or wireless communication with) the first controller 104 and/or the second controller 152.

With embodiments, such as generally illustrated in FIGS. 3A-3E, a support assembly 150 may include one or more first sensors 174 that may be connected to and/or disposed in the first section 160 of the support portion 158 and/or may be disposed adjacent to and/or proximate the stop portion 164. Additionally and/or alternatively, a first sensor 174 may be connected to, integrated within, and/or part of the track assembly 120 and/or another portion of the support assembly 150. A first sensor 174 may be configured to detect a position of the support assembly 150 relative to the track assembly 120, such as whether the stop portion 164 is disposed in close proximity to, in contact with, and/or in abutment with a first lip 132a and/or second lip 132b of the track 122. The first sensor 174 may provide a first indication (e.g., a "properly disposed" indication) when the support assembly 150 is properly disposed on the track assembly 120 (e.g., when a stop portion 164 contacts, abuts, and/or is within a threshold distance of a first and/or second lip 132a, 132b) as generally illustrated in FIGS. 3C and 3D. The first sensor 174 may provide a second indication (e.g., a "not disposed/improperly disposed" indication) when the support assembly 150 is not disposed on or is not properly disposed on the track assembly 120 (e.g., when a stop portion 164 does not contact and/or abut a first and/or second lip 132a, 132b), such as generally illustrated in FIGS. 3A, 3B, and 3E.

In embodiments, such as generally illustrated in FIGS. 3A-3E, a support assembly 150 may include one or more second sensors 176 that may be connected to and/or disposed in the second section 162 of the support portion 158 and may be disposed adjacent to the connectors 166. Additionally and/or alternatively, a second sensor 176 may be connected to, integrated within, and/or part of the track assembly 120 and/or another portion of the support assembly 150. A second sensor 176 may be configured to detect a position of one or more connectors 166. The second sensor 176 may convey a third indication/status (e.g., an "extended" indication/status) when the connector 166 is in the extended position as generally illustrated in FIGS. 3A, 3D, and 3E. The second sensor 176 may provide a fourth indication/status (e.g., a "retracted" indication/status) when the connector 166 is in the retracted position as generally illustrated in FIGS. 3B and 3C.

With embodiments, such as generally illustrated in FIGS. 3A-3E, a support assembly 150 may include a first support portion 158 and a second support portion 158'. A first support portion 158 may include a first section 160, a second section 162, a stop portion 164, one or more connectors 166, 166a, 166b, 166c having a base end 168 and a distal end 170, one or more electrical contacts 172, 172a, 172b, 172c, a first sensor 174, and/or a second sensor 176. A second support portion 158' may be configured in the same or a similar manner as the first support portion 158. For example, a second support portion 158' may include a first section 160', a second section 162', a stop portion 164', one or more connectors 166', 166a', 166b', 166c' having a base end 168' and a distal end 170', one or more electrical contacts 172', 172a', 172b', 172c', a first sensor 174', and/or a second sensor 176', some or all of which may be configured in the same or a similar manner as corresponding features of the first support portion 158.

In embodiments, such as generally illustrated in FIGS. 1 and 2, a first controller 104 and/or a second controller 152 may include support assembly position circuitry 110. The first controller 104, the second controller 152, and/or the position circuitry 110 may be configured to determine if the support assembly 150 is disposed on, is properly disposed on, and/or is properly mechanically connected to the track assembly 120, such as based on the information (e.g., indications, signals, etc.) received from a first sensor 174 and/or the second sensor 176. The first controller 104 and/or second controller 152 may, for example, determine (e.g., via the support assembly position circuitry 110) that (i) the support assembly 150 is properly disposed on the track assembly 120 when the first sensor 174 provides a first indication (e.g., a "properly disposed" indication), (ii) the support assembly 150 is not disposed on the track assembly 120 and/or is improperly disposed on the track assembly 120 when the first sensor 174 provides a second indication (e.g., a "not disposed/improperly disposed" indication), (iii) the support assembly 150 is properly mechanically connected to the track assembly 120 when the second sensor 176 provides a third indication (e.g., an "extended" indication), and/or (iv) the support assembly 150 is not mechanically connected to and/or is improperly mechanically connected to the track assembly 120 when the second sensor 176 provides a fourth indication (e.g., a "retracted" indication).

In embodiments, such as generally illustrated in FIGS. 1 and 2, the first controller 104 and/or the second controller 152 may include and/or be connected to a power source 108, 156 and/or may be configured to provide and/or route power to the bus bars 138 and/or the electrical contacts 172, such as to provide power to the support assembly 150 via the track assembly 120. The first controller 104 and/or a second controller 152 may include an injection circuit 114 and/or be configured to send, inject, provide, convey, etc. one or more signals (e.g., a diagnostics signal) to one or more bus bars 138, to a corresponding electrical contact 172, and/or through one or more electrical loops 118. In examples, the diagnostics signal may be an electrical signal. The first controller 104 and/or the second controller 152 may be configured to adjust one or more parameters of the diagnostics signal, such as the offset, amplitude, frequency, magnitude, etc. Additionally and/or alternatively, a parameter of the diagnostics signal may relate to its form (e.g., constant, pulsed, sinusoidal, etc.). The injection circuit 114 may include, for example and without limitation, one or more of a current source, one or more semiconductors (e.g., MOSFETs), a voltage source, an oscillator, an operational amplifier circuit (OP AMP circuit), a signal generator, etc.

With embodiments, such as generally illustrated in FIGS. 1 and 2, the first controller 104 and/or the second controller 152 may include a monitoring circuit 112 and/or may be configured to monitor one or more electrical loops 118. Monitoring an electrical loop 118 may include analyzing the diagnostics signal injected into the electrical loop 118 and determining and/or providing one or more characteristics (e.g., electrical and/or physical characteristics) of the electrical loop 118, such as impedance, capacitance, resistance, electrical contact surface resistance, voltage, current, temperature, continuity, length, etc. (e.g., according, at least in part, to the diagnostic signal and/or changes thereto). For example and without limitation, the monitoring circuit 112 may include one or more sensors, which may include one or more sensors configured to sense/detect at least one characteristic/parameters of the electrical loop 118 such as, for example and without limitation, a temperature sensor, a voltage sensor, a resistance sensor, and/or a current sensor. The monitoring circuit 112 may include, for example and without limitation, one or more of a comparator, demodulator, an OP AMP circuit, etc. The monitoring circuit 112 may, for example, be disposed at or about an end of an electrical loop 118 into which a diagnostics signal is injected. The monitoring circuit 112 may be configured to evaluate some or all characteristics, define a quality of the loop (e.g., according to the characteristics), determine one or more actions based on the characteristics (as repeating measure), report an issue to other unit (e.g., if characteristics are outside thresholds), and/or record on a memory one or more critical characteristics.

With embodiments, such as generally illustrated in FIGS. 1 and 2, a first controller 104 and/or a second controller 152 may include a diagnostics circuit 116. The first controller 104, the second controller 152, and/or the diagnostics circuit 116 may be configured to (i) select one or more bus bars 138-138c, 138'-138c', connectors 166-166c, 166'-166c', and/or electrical loops 118 into which the diagnostics signal is to be injected, (ii) to establish the selected electrical loop(s) 118 and/or one or more electrical loops 118 including the selected bus bars 138, 138' and/or connectors 166, 166' (e.g., via making necessary electrical connections/disconnections, actuating one or more connectors 166, 166', adjusting one or more elements of the electrical system 102 into an idle state, etc.), and/or (iii) to determine (e.g., calculate, measure, etc.) an estimated electrical contact surface resistance of the electrical connection between the support assembly 150 and the track assembly 120. The first controller 104 and/or the second controller 152 may be configured to determine the electrical contact surface resistance of the electrical connection based on the parameters of the diagnostics signal and/or the monitored characteristics of the electrical loop 118 (e.g., obtained via the monitoring circuit 112). The first controller 104 and/or the second controller 152 may be configured to determine whether the support assembly 150 is properly electrically connected to the track assembly 120. The first controller 104 and/or the second controller 152 may, for example, determine that the support assembly 150 is not properly electrically connected to the track assembly 120 when the estimated electrical contact surface resistance is outside of a predetermined range, and/or determine that the support assembly 150 is properly electrically connected to the track assembly 120 when the estimated electrical contact surface resistance is within the predetermined range. If the surface resistance is above the predetermined range, an electrical contact 172 may not be fully/properly connected with a corresponding bus bar 138 (e.g., is only partially connected).

In embodiments, the first controller 104 and/or the second controller 152 may be configured to determine if the support assembly 150 and the track assembly 120 are properly connected to one another, for example, when the electrical system 102, the first controller 104, and/or the second controller 152 are switched into a diagnostics mode. The support assembly 150 and the track assembly 120 may be properly connected to one another when the support assembly 150 is properly disposed on the track assembly 120, when the support assembly 150 and the track assembly 120 are properly mechanically connected to one another, and/or when the support assembly 150 and the track assembly 120 are properly electrically connected to one another. The first controller 104 and/or the second controller 152 may, for example, determine that the support assembly 150 and the track assembly 120 are properly connected to one another, as generally depicted in FIG. 3D, if the first sensor 174 provides the first indication, the second sensor 176 provides the third indication, and the electrical contact surface resistance is within the predetermined range. The first controller 104 and/or the second controller 152 may be configured to switch into a diagnostics mode and/or determine if the support assembly 150 and the track assembly 120 are properly connected to one another at specific times (e.g., periodically) and/or upon the occurrence of certain events (e.g., adjustment of a support assembly 150, vehicle and/or engine start up, detection of a possible malfunction, upon receiving a command from a user, etc.)

The first controller 104 and/or the second controller 152 may determine that the support assembly 150 and the track assembly 120 are not properly connected to one another if (i) the first sensor 174 provides the second indication and the second sensor 176 provides the third indication (see FIGS. 3A and 3E), (ii) the first sensor 174 provides the second indication and the second sensor 176 provides the fourth indication (see FIG. 3B), (iii) the first sensor 174 conveys the first indication and the second sensor 176 conveys the fourth indication (see FIG. 3C), and/or (iv) the estimated electrical contact surface resistance is outside the predetermined range.

Figure 4:
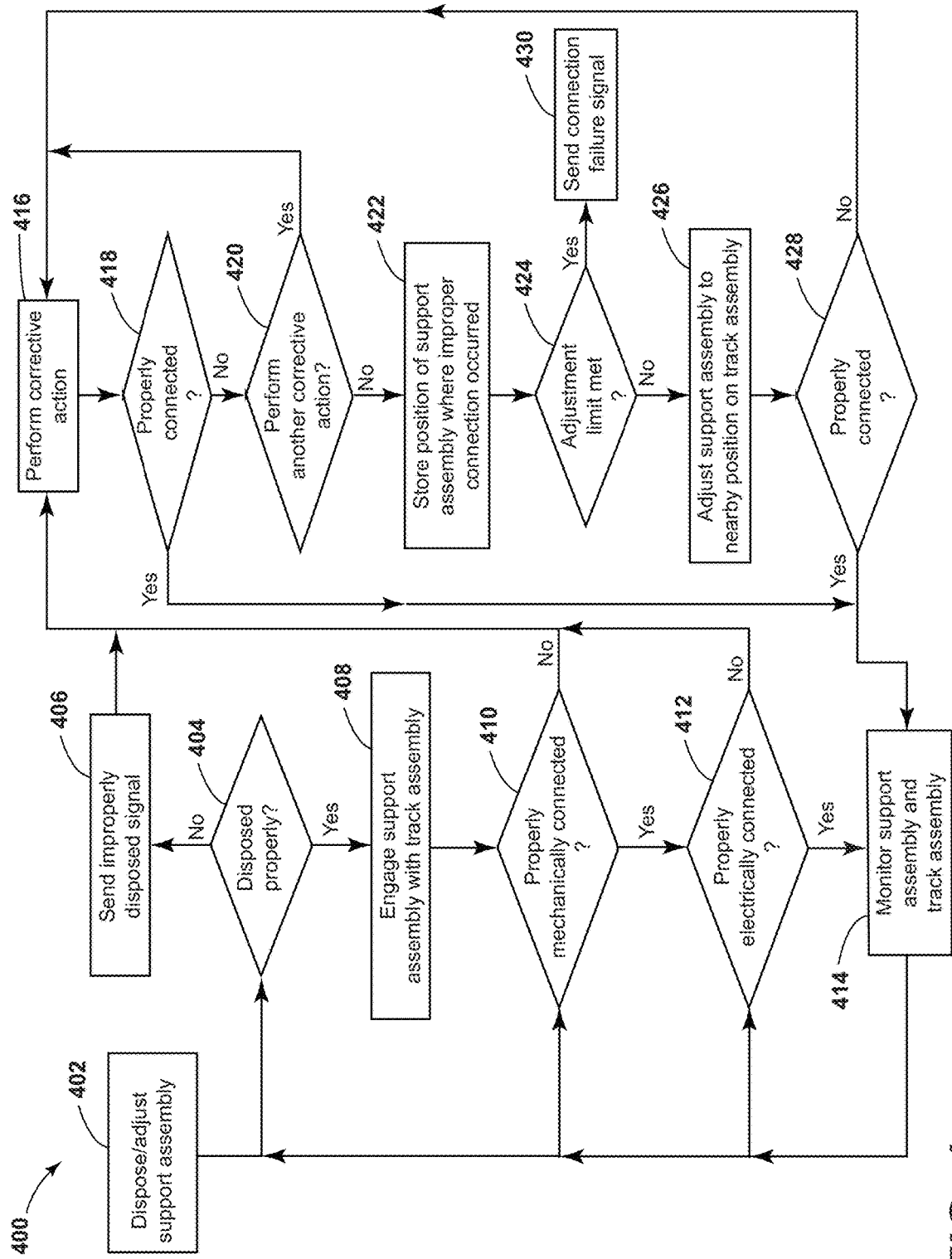
FIG. 4 is flow diagram generally illustrating an embodiment of a method of operating an electrical system according to teachings of the present disclosure.

An embodiment of a method 400 for operating an electrical system 102 is generally illustrated in FIG. 4. At block 402, a support assembly 150 may be disposed and/or adjusted on the track assembly 120 to a desired support assembly position (e.g., installing the support assembly 150 at the desired support assembly position, moving the support assembly 150 to the desired support assembly position via a support assembly actuator/adjuster 180), which may include engaging a support portion 158 with a track 122. Engaging a support portion 158 with the track 122 may include actuating and/or adjusting the connector 166 into the retracted position, and/or inserting a second section 162 of a support portion 158 through a track opening 136 and into a track receptacle 134 until a stop portion 164 of the support portion 158 abuts against a first and/or second lip 132a, 132b of the track 122, such as while the connector 166 is in the retracted position. A first sensor 174 may then detect whether the support assembly 150 has been properly disposed and/or positioned on the track assembly 120 and provide/convey the corresponding indication/status (e.g., a first indication, a second indication).

With embodiments, at block 404, the first controller 104 and/or the second controller 152 may switch into a diagnostics mode and/or may determine whether the support assembly 150 is disposed on and/or has been properly disposed on the track assembly 120. If the first sensor 174 provides a first indication (e.g., a "properly disposed" indication), the first controller 104 and/or the second controller 152 may determine that the support assembly 150 is properly disposed on the track assembly 120 and proceed to block 408. If the first sensor 174 provides a second indication (e.g., a "not disposed/improperly disposed" indication), the first controller 104 and/or the second controller 152 may determine that the support assembly 150 is not disposed on the track assembly 120, that the support assembly 150 is improperly disposed on the track assembly 120, and/or that the seat assembly 150 and the track assembly 120 have not been properly connected to one another. In such a situation, the method 400 may proceed to block 406 and the first controller 104 and/or the second controller 152 may send corresponding information (e.g., a signal, alert, notification, etc.) to a user, to another vehicle system (e.g., an entertainment system, an alert system), to a user's mobile device, a remote computer/location, etc. Additionally and/or alternatively, the method 400 may proceed from block 406 (or directly from block 404) to block 416 if the first controller 104 and/or the second controller 152 determines that the support assembly 150 is not disposed on the track assembly 120 and/or is improperly disposed on the track assembly 120.

In embodiments, at block 408, the first controller 104 and/or the second controller 152 may engage the support assembly 150 and the track assembly 120 with one another. Engaging the support assembly 150 and the track assembly 120 may include mechanically and/or electrically connecting the support assembly 150 and the track assembly 120 to one another. Mechanically and/or electrically connecting the support assembly 150 and the track assembly 120 may include actuating and/or adjusting the connector 166 from the retracted position to the extended position via the first controller 104 and/or the second controller 152. Adjusting the connector 166 from the retracted position to the extended position may include engaging the connector 166 with the track 122 and/or engaging an electrical contact 172 of the connector 166 with a bus bar 138 of the track 122. Engaging the support assembly 150 and the track assembly 120 may additionally and/or alternatively include forming an electrical loop 118 (e.g., a closed path circuit) extending through the support assembly 150 and the track assembly 120, such as by engaging a connector 166 and/or an electrical contact 172 with a track 122 and/or a bus bar 138, respectively. Engaging the support assembly 150 and the track assembly 120 may include supplying power to an electrical loop 118 via one or more power sources 108, 156. Providing power to the electrically loop 118 may include passing and/or flowing power (e.g., as an electrical current) from a connector 166 to a bus bar 138 and/or from a bus bar 138 to a connector 166. Additionally and/or alternatively, engaging a connector 166 with the track 122 may include connecting one or physical structures to restrict longitudinal movement (e.g., X-direction movement) and/or vertical movement (e.g., Z-direction movement, removal, etc.) of the support assembly 150 relative to the track assembly 120. For example and without limitation, a connector 166e, 166e' may rotate into engagement with an inner track 122a, 122a'. A connector 166e, 166e' may, for example, be configured as a latch, a male or female connector, and/or a pin, among others. A second sensor 176 may than detect the position of the connector 166 and provide/convey the corresponding indication/status (e.g., a third indication, a fourth indication).

In embodiments, at block 410, the first controller 104 and/or the second controller 152 may determine whether the support assembly 150 and the track assembly 120 have been properly mechanically connected to one another. If the second sensor 176 provides the third indication (e.g., an "extended" indication), the first controller 104 and/or the second controller 152 may determine that the support assembly 150 and the track assembly 120 are properly mechanically connected and proceed to block 412. If the second sensor 176 provides the fourth indication (e.g., a "retracted" indication), the first controller 104 and/or the second controller 152 may determine that the support assembly 150 is improperly mechanically connected to the track assembly 120 and proceed to block 416.

With embodiments, at block 412, the first controller 104 and/or the second controller 152 may determine whether the support assembly 150 has been properly electrically connected to the track assembly 120, such as via an injection circuit 114, a monitoring circuit 112, and/or a diagnostics circuit 116 of the first controller 104 (see FIG. 1) and/or the second controller 152 (see FIG. 2). Determining whether the support assembly 150 has been properly electrically connected to the track assembly 120 may include the first controller 104, the second controller 152, and/or the diagnostics circuit 116 selecting one or more bus bars 138, 138', connectors 166, 166', and/or electrical loops 118 to test. The first controller 104, the second controller 152, and/or the diagnostics circuit 116 may then establish the selected electrical loop(s) 118 and/or one or more electrical loops 118 including the selected bus bars 138, 138' and/or connectors 166, 166' (e.g., via making necessary electrical connections/disconnections, actuating one or more connectors 166, 166', adjusting one or more elements of the electrical system 102 into an idle state, etc.), In embodiments, determining whether the support assembly 150 has been properly electrically connected to the track assembly 120 may include the first controller 104, the second controller 152, and/or the injection circuit 114 providing, injecting, sending, etc. a signal (e.g. a diagnostics signal) having controlled parameters through one or more electrical loops 118 via one or more bus bars 138, 138' and/or connectors 166, 166' (e.g., the selected bus bars 138, 138' and/or the selected connectors 166, 166'). Determining whether the support assembly 150 has been properly electrically connected to the track assembly 120 may include the first controller 104, the second controller 152, and/or the monitoring circuit 112 monitoring one or more electrical loops 118 (e.g., the electrical loops 118 into which the diagnostics signal has been injected). Monitoring an electrical loop 118 may include analyzing the diagnostics signal injected into the electrical loop 118 (and any changes thereto) and determining and/or providing one or more characteristics (e.g., electrical and/or physical characteristics) of the electrical loop 118, such as impedance, capacitance, resistance, electrical contact surface resistance, voltage, current, temperature, continuity, length, etc.

With embodiments, determining whether the support assembly 150 has been properly electrically connected to the track assembly 120 may include the first controller 104, the second controller 152, and/or the diagnostics circuit 116 determining (e.g., calculating, measuring, etc.) an estimated electrical surface contact resistance of the electrical connection between the support assembly 150 and the track assembly 120. The first controller 104 and/or the second controller 152 may determine the estimated electrical surface contact resistance of the electrical connection based on the controlled parameters of the diagnostics signal and/or the monitored characteristic of the electrical loop 118. Determining whether the support assembly 150 has been properly electrically connected to the track assembly 120 may also include comparing the determined/measured electrical surface contact resistance to a predetermined electrical surface contact resistance range via the first controller 104 and/or the second controller 152. If the estimated electrical surface contact resistance is within the predetermined electrical surface contact resistance range, the first controller 104 and/or the second controller 152 may determine that the support assembly 150 and the track assembly 120 have been properly electrically connected and, thus, may determine that the support assembly 150 and the track assembly 120 are properly connected to one another. The method 400 may then proceed to block 414. If the estimated electrical surface contact resistance is outside of the predetermined electrical surface contact resistance range, the first controller 104 and/or the second controller 152 may determine that the support assembly 150 and the track assembly 120 have not been properly electrically connected, that the support assembly 150 and the track assembly 120 have not been properly connected, and/or may proceed to block 416.

In embodiments, at block 414, the first controller 104 and/or the second controller 152 may continue to monitor the support assembly 150 and the track assembly 120. Monitoring the support assembly 150 and the track assembly 120 at block 414 may include periodically, randomly, and/or substantially continuously repeating the process(es) of block 404 and/or block 410. The first controller 104 and/or the second controller 152 may continue this monitoring process until a user changes the desired position of the support assembly 150 and/or until a user disconnects and/or removes the support assembly 150 from the track assembly 120, at which point the method 400 may end and/or restart.

With embodiments, at block 416, the first controller 104 and/or the second controller 152 may automatically attempt to repair, fix, and/or resolve the improper/unsuccessful connection between the support assembly 150 and the track assembly 120 (e.g., an improper disposing of the support assembly 150 on the track assembly 120, an improper mechanical and/or electrical connection between the support assembly 150 and the track assembly 120), such as by initiating a corrective action. The corrective action may include one or more actions performed by the support assembly 150, the track assembly 120, and/or another connected assembly. The corrective action may include, for example and without limitation, (i) disengaging the connector 166 from the track 122 (e.g., retracting the connector 166 from the extended position toward and/or to the retracted position) and reengaging the connector 166 and the track 122 (e.g., extending the connector 166 back to the extended position), (ii) adjusting the support assembly 150 from an original/desired support assembly position to a secondary support assembly position and adjusting the support assembly 150 from the secondary support assembly position back to the original/desired position, and/or (iii) attempting to clear, move, and/or remove an obstruction/debris (e.g., dust, dirt, food crumbs/waste/spillage, garbage, corrosive byproducts, etc.) that may be interfering/preventing proper disposing of the support assembly 150 and/or establishment of a proper mechanical and/or electrical connection. Additionally and/or alternatively, the corrective action (e.g., moving and/or removing debris) may include cleaning the track assembly 120 (e.g., the track 122) and/or the support assembly 150 (e.g., the connector 166, the electrical contact 172, etc.), such as by producing mechanical friction (e.g., via contact brushing), localized heating (e.g., via providing increased voltage and/or current to the electrical loop 118), etc.

In embodiments, moving/removing debris and/or cleaning the assemblies 120, 150 may include adjusting the support assembly 150 back and forth along the track 122 in a region of an original/desired support assembly position, for example. While adjusting the support assembly 150 back and forth, the connector 166 may be in and/or close to the extended position such that connector 166 is in contact with and/or close to the track 122. In this manner, the connector 166 may be able to contact, move, and/or remove debris preventing the support assembly 150 from being properly disposed on, mechanically connected to, and/or electrically connected to the track assembly 120. For example, the connector 166 may be slid, dragged, scraped, etc. across one or more surfaces of the track 122 (e.g., a bus bar 138) and/or debris disposed thereon such that mechanical friction may be produced when the support assembly 150 is adjusted back and forth along the track 122, which may further facilitate removal of debris that is stuck to the track 122 (e.g., a bus bar 138) and/or the connector 166 (e.g., the electrical contact 172) thereby cleaning the assemblies 120, 150. After the corrective action has been performed, the support assembly 150 may be adjusted, returned, disposed, etc., such as via the first controller 104 and/or the second controller 152 controlling an actuator 180, to the original/desired position and/or the first controller 104 and/or the second controller 152 may conduct one or more of the processes/actions of blocks 402 and 408.

With embodiments, at block 418, the first controller 104 and/or the second controller 152 may determine whether the corrective action of block 416 resolved, fixed, addressed, etc. the improper connection. To determine whether the corrective action of block 416 resolved, fixed, addressed, etc. the improper connection, the first controller 104 and/or the second controller 152 may determine whether the support assembly 150 and the track assembly 120 have been properly connected as described above, such as via conducting one or more of the processes/actions of block 404 and/or block 410. If the first controller 104 and/or the second controller 152 determines that the corrective action was effective and/or that the support assembly 150 and the track assembly 120 have been properly connected (e.g., the support assembly 150 is disposed properly on the track assembly 120, and the support assembly 150 and the track assembly 120 are properly mechanically and electrically connected), the method 400 may proceed to block 414. If the first controller 104 and/or the second controller 152 determines that the support assembly 150 and track assembly 120 have not been properly connected to one another (e.g., the support assembly 150 is disposed improperly on the track assembly 120, the support assembly 150 and the track assembly 120 are not properly mechanically connected, and/or the support assembly 150 and the track assembly 120 are not properly electrically connected), the method 400 may proceed to block 420.

With embodiments, at block 420, the first controller 104 and/or the second controller 152 may determine whether another corrective action (e.g., repeating a previously performed corrective action and/or performing a different, previously unperformed corrective action) could potentially resolve the improper connection between the support assembly 150 and the track assembly 120. If the first controller 104 and/or the second controller 152 determines that another corrective action could potentially resolve the improper connection, the method 400 may loop back to block 416 and perform another corrective action. If the first controller 104 and/or the second controller 152 determines that another corrective action would be unlikely to resolve the improper connection and/or that a maximum number of corrective actions have been performed, the method 400 may proceed to block 422.

In embodiments, at block 422, the first controller 104 and/or the second controller 152 may determine that the support assembly 150 and the track assembly 120 are not properly connectable to one another at the desired support assembly position and may store the desired support assembly position in a memory 184, 186 (e.g., an electronic memory). The memory 184, 186 may be part of and/or connected to the first controller 104, the second controller 152, and/or another connected system. The desired support assembly position may, for example, be added to a list of unavailable support assembly positions stored in the memory 184, 186, which may include one or more support assembly positions where an improper connection has occurred and was unable to be resolved via the corrective action. The unavailable support assembly positions list may be accessed by a user (e.g., a repair technician) to facilitate identifying the location of defects, obstructions, and/or other problem sources during maintenance. Additionally or alternatively, the first controller 104 and/or the second controller 152 may check the memory 184, 186 to confirm whether a desired support assembly position selected/input by a user is stored in the unavailable support assembly positions list of the memory 184, 186 and/or may prevent a user from adjusting the support assembly 150 to (e.g., stopping at and/or a final adjustment at) a position included in the unavailable support assembly positions list (e.g., the first controller 104 and/or the second controller 152 may adjust the support assembly 150 to a position to one side or the other of the desired position).

With embodiments, at block 424, the first controller 104 and/or the second controller 152 may determine whether a position adjustment limit has been met as described in more detail below. At block 426, the first controller 104 and/or the second controller 152 may adjust the support assembly 150 to an alternate support assembly position near and/or adjacent to the desired support assembly position and the first controller 104 and/or the second controller 152 may conduct one or more of the processes/actions of block 408.

In embodiments, at block 428, the first controller 104 and/or the second controller 152 may determine whether the support assembly 150 and the track assembly 120 have been properly connected at the alternate support assembly position, such as via one or more processes described above with respect to block 404 and/or block 410. If the first controller 104 and/or the second controller 152 determines that the support assembly 150 and the track assembly 120 have been properly connected to one another at the alternate support assembly position, the method 400 may proceed to block 414. If the first controller 104 and/or the second controller 152 determines that the support assembly 150 and the track assembly 120 have not been properly connected to one another at the alternate support assembly position, the method 400 may loop back to block 416 and blocks 416-428 may be repeated with respect to the alternate support assembly position.

With embodiments, there may not be any support assembly positions near and/or adjacent to the desired support assembly position where the support assembly 150 and track assembly 120 may be properly connected to one another and/or a malfunction may occur that prevents proper connection in any position. The method 400 may utilize a position adjustment limit and/or threshold so that the support assembly 150 may only be adjusted to an alternate position a certain number of times for any desired support assembly position and/or per support assembly 150. For example, at block 424, the first controller 104 and/or the second controller 152 may determine the number of times the support assembly 150 has been adjusted to an alternate support assembly position (e.g., the number of alternative positions attempted) and compare this number to the position adjustment limit to determine whether the position adjustment limit has been met. If the position adjustment limit has not been met, the method 400 may proceed from block 424 to block 426. If the position adjustment limit has been met, the method 400 may proceed from block 424 to block 430.

In embodiments, at block 430, the first controller 104 and/or the second controller 152 may send information (e.g., a signal, alert, notification, etc.) to the user and/or another system and the method 400 may end. This information may notify a user and/or another system that there has been a connection failure, notify the user and/or another system that the electrical system 102 is in need of maintenance, and/or prevent the vehicle 100 from being operated (e.g., shifted into drive mode), for example.

Figure 5:
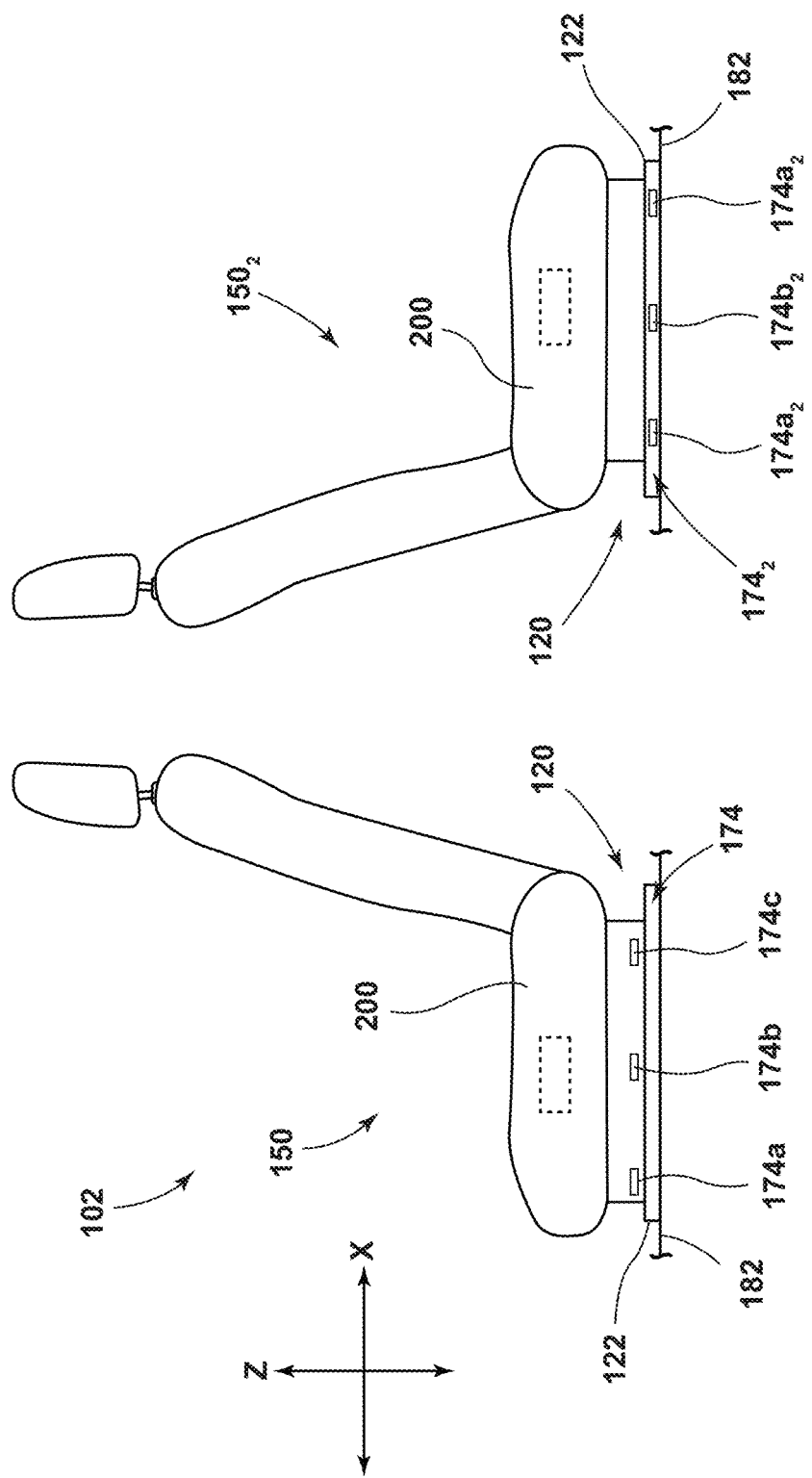
FIG. 5 is a side view of an embodiment of an electrical system according to teachings of the present disclosure.

With embodiments, such as generally illustrated in FIG. 5, an electrical system 102 may include a first support assembly 150 and/or a second support assembly 1502, which may be configured for selective connection with, movement along/relative to, and/or removal from one or more tracks 122 of a track assembly 120. For example, the first support assembly 150 and the second support assembly 1502 may be connected to the same track assembly 120 simultaneously.

In embodiments, such as generally illustrated in FIG. 5, a support assembly (e.g., first support assembly 150) may include a first sensor 174 that may include a plurality of portions 174a, 174b, 174c, and/or a track assembly 120 may include a first sensor 1742 that may include a plurality of portions 174a2, 174b2, 174c2 that may be spaced in a longitudinal direction (e.g., an X-direction), such as to detect the relative positions of the support assembly 150, 1502 and the track assembly 120 at multiple locations along the support assembly 150 and/or along the track assembly 120. The first sensor 174, 1742 may be configured to provide the first indication (e.g., "properly disposed" indication/status) if all portions 174a, 174b, 174c, 174a2, 174b2, 174c2 of the first sensor 174, 1742 sense that the support assembly 150, 1502 is adjacent the track assembly 120. If any portion of the first sensor 174, 1742 senses that a support assembly 150, 1502 is not adjacent the track assembly 120, the first sensor 174, 1742 may provide the second indication (e.g., "not disposed/improperly disposed" indication/status).

In embodiments, a first sensor 174, 1742 may be configured to provide a different indication (e.g., a "detected" indication instead of the first indication) if a support assembly 150, 1502 is detected and not near a track assembly 120 (e.g., if the support assembly 150, 1502 is more than a threshold distance from the track assembly 120, but is still detected, such as if it is not intended to be connected to the track assembly 120).

In examples, a controller (e.g., controllers 104, 152) and/or an ECU (e.g., ECUs 106, 154) may include an electronic controller and/or include an electronic processor, such as a programmable microprocessor and/or microcontroller. In embodiments, an ECU may include, for example, an application specific integrated circuit (ASIC). An ECU and/or a controller may include a central processing unit (CPU), a memory (e.g., a non-transitory computer-readable storage medium), and/or an input/output (I/O) interface. An ECU and/or a controller may be configured to perform various functions, including those described in greater detail herein, with appropriate programming instructions and/or code embodied in software, hardware, and/or other medium. In embodiments, an ECU and/or a controller may include a plurality of controllers. In embodiments, an ECU and/or a controller may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that an electronic control unit (ECU), a controller, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals. As described herein, a circuit (e.g., a monitoring circuit 112, an injection circuit 114, a diagnostic circuit 116) may or may not be configured a complete circuit.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An electrical system of a vehicle, comprising:
    a track assembly including a bus bar;
    a support assembly removably and adjustably connected to the track assembly, the support assembly including a contact configured to engage the bus bar;
    a sensor; and
    at least one electronic control unit operatively connected to the bus bar and the sensor;
    wherein the at least one electronic control unit is configured to determine whether the support assembly and the track assembly are properly connected; and
    determining whether the support assembly and the track assembly are properly connected includes:
        (i) providing a signal with controlled parameters to the contact;
        (ii) monitoring, via the sensor, at least one characteristic of an electrical loop formed at least partially by the contact and the bus bar; and
        (iii) determining whether the support assembly and the track assembly are properly electrically connected to one another based on the signal and/or the at least one characteristic.

2. The electrical system of claim 1, wherein the at least one electronic control unit is configured to:
    determine, via the sensor, a position of the support assembly relative to the track assembly; and
    automatically perform a corrective action if the support assembly and the track assembly are not properly connected; and
    wherein performing the corrective action includes controlling an actuator to move the support assembly (a) from an original position to a secondary position, and (b) from the secondary position to the original position.

3. A method of operating an electrical system of a vehicle, comprising:
    connecting a support assembly and a track assembly to one another;
    determining, via a sensor associated with the support assembly and/or the track assembly, whether the support assembly and the track assembly are properly connected;
    performing, automatically via an electronic control unit, a corrective action if the support assembly and the track assembly are not properly connected; and
    after performing the corrective action, determining whether the support assembly and the track assembly are properly connected.

4. The method according to claim 3, wherein performing the corrective action includes automatically attempting to clear debris from the support assembly and/or the track assembly.

5. The method according to claim 3, wherein performing the corrective action includes (i) adjusting the support assembly from a desired support assembly position to a secondary support assembly position via an actuator and (ii) adjusting the support assembly from the secondary support assembly position back to the desired support assembly position via the actuator.

6. The method according to claim 3, wherein performing the corrective action includes adjusting the support assembly forward and rearward along the track assembly in a region of a desired support assembly position to clear an obstruction preventing the support assembly and the track assembly from properly connecting.

7. The method according to claim 3, wherein:
    connecting the support assembly and the track assembly includes engaging a connector of the support assembly with the track assembly; and performing the corrective action includes removing debris from the track assembly via dragging the connector across a surface of the track assembly.

8. The method according to claim 7, including:
disengaging the connector from the track assembly when the support assembly and the track assembly have not been properly connected; and
engaging the connector with the track assembly after performing the corrective action;
wherein the corrective action is performed while the connector is disengaged.

9. The method according to claim 8, wherein:
engaging the connector with the track assembly includes engaging the connector with the track assembly when the support assembly is in a desired support assembly position; and
engaging the connector with the track assembly after performing the corrective action includes engaging the connector with the track assembly in the desired support assembly position.

10. The method according to claim 9, including storing the desired support assembly position in a memory of the electronic control unit if the electronic control unit determines that the support assembly and the track assembly are not properly connected after performing the corrective action.

11. The method according to claim 10, wherein storing the desired support assembly position in the memory includes adding the desired support assembly position to a list of unavailable support assembly positions stored in the memory.

12. The method according to claim 11, including preventing final adjustment of the support assembly to any of the unavailable support assembly positions stored in the memory.

13. The method according to claim 3, wherein connecting the support assembly and the track assembly includes forming an electrical loop via establishing an electrical connection between the support assembly and the track assembly.

14. The method according to claim 13, wherein determining whether the support assembly and the track assembly are properly connected includes monitoring at least one characteristic of the electrical loop.

15. The method according to claim 14, wherein the at least one characteristic of the electrical loop includes at least one of an impedance and a capacitance.

16. The method according to claim 13, wherein determining whether the support assembly and the track assembly are properly connected includes providing a signal having controlled parameters to the electrical loop.

17. The method according to claim 16, wherein determining whether the support assembly and the track assembly are properly connected includes:
monitoring a characteristic of the electrical loop;
determining an estimated electrical contact surface resistance of the electrical connection based on the controlled parameters of the signal and the monitored characteristic of the electrical loop; and
determining that the support assembly and the track assembly are not properly connected when the estimated electrical contact surface resistance is outside of a predetermined range.

18. An electrical system of a vehicle, comprising:
a track assembly including a bus bar;
a support assembly removably and adjustably connected to the track assembly, the support assembly including a contact configured to contact the bus bar;
a sensor; and
at least one electronic control unit electrically connected to the sensor;
wherein the at least one electronic control unit is configured to:
determine whether the support assembly and the track assembly are properly connected; and
automatically perform a corrective action if the support assembly and the track assembly are not properly connected.

19. The electrical system of claim 18, wherein determining whether the support assembly and the track assembly are properly connected includes:
(i) providing a signal with controlled parameters to the contact;
(ii) monitoring, via the sensor, at least one characteristic of an electrical loop formed at least partially by the contact and the bus bar; and
(iii) determining whether the support assembly and the track assembly are properly electrically connected to one another based on the signal and/or the at least one characteristic.

20. The electrical system of claim 19, wherein:
the at least one electronic control unit includes a first electronic control unit and a second electronic control unit;
the first electronic control unit is disposed separately from the support assembly;
the second electronic control unit is integrated with and configured to move with the support assembly; and
the first electronic control unit and the second electronic control unit are operatively connected to one another.

* * * * *